United States Patent
Han et al.

(10) Patent No.: US 10,026,565 B2
(45) Date of Patent: Jul. 17, 2018

(54) SWITCH CONTACT ELEMENT AND ITS PREPARATION METHOD

(71) Applicant: NANTONG MEMTECH TECHNOLOGIES CO., LTD., Jiangsu (CN)

(72) Inventors: Huisheng Han, Nantong (CN); Hongmei Zhang, Nantong (CN); Yuan Chen, Nantong (CN); Yang Ding, Nantong (CN); Guoqiang Wu, Nantong (CN)

(73) Assignee: NANTONG MEMTECH TECHNOLOGY CO., LTD., Nantong (CN)

( * ) Notice: Subject to any disclaimer, the term of this patent is extended or adjusted under 35 U.S.C. 154(b) by 142 days.

(21) Appl. No.: 14/896,405

(22) PCT Filed: Nov. 12, 2014

(86) PCT No.: PCT/CN2014/090915
§ 371 (c)(1),
(2) Date: Dec. 7, 2015

(87) PCT Pub. No.: WO2015/101110
PCT Pub. Date: Jul. 9, 2015

(65) Prior Publication Data
US 2016/0126024 A1 May 5, 2016

(30) Foreign Application Priority Data
Dec. 31, 2013 (CN) .......................... 2013 1 0748955

(51) Int. Cl.
*H01H 1/02* (2006.01)
*H01H 1/021* (2006.01)
(Continued)

(52) U.S. Cl.
CPC ............. *H01H 1/021* (2013.01); *B32B 15/06* (2013.01); *B32B 15/18* (2013.01); *B32B 15/20* (2013.01);
(Continued)

(58) Field of Classification Search
CPC ...... H01H 2201/032; H01H 1/00; H01H 1/02; H01H 1/021; H01H 1/0237; H01H 1/029;
(Continued)

(56) References Cited

U.S. PATENT DOCUMENTS

| 6,245,445 B1 | 6/2001 | Lykins, II | |
| 2007/0298231 A1* | 12/2007 | Ito | B32B 27/00 428/213 |
| 2010/0289762 A1* | 11/2010 | Ito | B32B 7/02 345/173 |

FOREIGN PATENT DOCUMENTS

| CN | 102354629 A | 2/2012 |
| CN | 102958280 A | 3/2013 |

(Continued)

*Primary Examiner* — Anthony R. Jimenez
(74) *Attorney, Agent, or Firm* — Treasure IP Group, LLC

(57) ABSTRACT

A switch contact element, having a layered structure comprising three layers: the bottom layer is silicone rubber, the middle layer is a continuous base metal sheet layer, and the upper layer is a discontinuous (stripe-shaped, raised-point-shaped or lattice-shaped) precious metal plated layer or a double-metal composite layer of a discontinuous base metal plated layer and a precious metal plated layer. The thickness of the bottom layer is greater than that of the middle layer, the thickness of the middle layer is greater than that of the upper layer, and the thickness of the upper layer meets the conditions that the conductive current is greater than safe current of conductive contacts on a circuit board, and the service life of a switch for the design is ensured.

6 Claims, 1 Drawing Sheet

(51) Int. Cl.
*H01H 1/06* (2006.01)
*H01H 11/04* (2006.01)
*C23C 18/31* (2006.01)
*C23F 1/16* (2006.01)
*C23F 1/32* (2006.01)
*C25D 3/12* (2006.01)
*C25D 3/48* (2006.01)
*C25D 7/00* (2006.01)
*C08J 5/12* (2006.01)
*B32B 15/06* (2006.01)
*B32B 15/18* (2006.01)
*B32B 15/20* (2006.01)
*B32B 25/20* (2006.01)

(52) U.S. Cl.
CPC ............... *B32B 25/20* (2013.01); *C08J 5/12* (2013.01); *C23C 18/31* (2013.01); *C23F 1/16* (2013.01); *C23F 1/32* (2013.01); *C25D 3/12* (2013.01); *C25D 3/48* (2013.01); *C25D 7/00* (2013.01); *H01H 1/06* (2013.01); *H01H 11/04* (2013.01); *B32B 2255/06* (2013.01); *B32B 2255/20* (2013.01); *B32B 2255/205* (2013.01); *B32B 2255/28* (2013.01); *B32B 2307/202* (2013.01); *B32B 2307/714* (2013.01); *B32B 2307/75* (2013.01); *B32B 2457/00* (2013.01); *H01H 2201/032* (2013.01)

(58) Field of Classification Search
CPC ........ H01H 1/04; H01H 1/06; H01H 2001/00; H01H 2001/0036; H01H 2001/0052; H01H 2001/02; H01H 2001/021; H01H 2209/00; H01H 2209/002; B32B 2255/06; B32B 2255/20; B32B 2255/205; B32B 2255/28; B32B 2307/202; B32B 2307/714; B32B 2307/75; B32B 25/20; B32B 15/06; B32B 15/18; B32B 15/20; B23B 2457/00; C08J 5/12; C23C 18/31; C23F 1/16; C23F 1/32; C25D 3/12; C25D 3/48; C25D 7/00
USPC ........................................................ 200/265
See application file for complete search history.

(56) References Cited

FOREIGN PATENT DOCUMENTS

| | | |
|---|---|---|
| CN | 103700517 A | 4/2014 |
| CN | 203690124 U | 7/2014 |
| CN | 104103432 A | 10/2014 |
| CN | 104112607 A | 10/2014 |
| CN | 104217878 A | 12/2014 |

* cited by examiner

SWITCH CONTACT ELEMENT AND ITS PREPARATION METHOD

CROSS REFERENCE TO RELATED APPLICATION

This application is a national stage application of a PCT application PCT/CN2014/090915, Dec. 11, 2014, entitled "A Precious Metal Switch Contact Element and Its Preparation Method," which further claims priority to Chinese Application No. 201310748955.0, filed on Dec. 31, 2013. The international application and Chinese Application are incorporated herein by reference in their entireties.

TECHNICAL FIELD

This invention relates to the electric contact components, which connects to circuit and is capable of conducting the circuit as used in switches, buttons or keypads in electronic industry or electric power industry.

BACKGROUND OF THE INVENTION

A common structure of a contact component (or a conductive pill) as used in a corresponding switch panel or keypad is as follows:

A metal surface layer and an elastic material (such as a rubber layer) are bonded together. Gold, silver and other precious metals have good electrical conductivity, good chemical stability and other properties, and thus they are commonly used as the contact materials. However, their expensive prices limit their applications. The chemical stability of copper, a base metal, is not as good as a precious metal. Some base metals such as nickel, titanium, iron and their alloys, including stainless steels, having a good chemical stability, are not as ideal as precious metals with respect to the use as a contact material, and their conductivities are low as compared to silver, copper and gold. However, their commercial availability is comparatively better and their prices are much less than precious metals when used as conductive materials or contact materials. There are advantages and disadvantages if either a base metal or a precious metal is used alone.

Chinese Patent Application No. 02152226.X discloses "A Moving Contact Assembly, the Panel Switch with it, and the Electronic Equipment with the Panel Switch", which introduces a method to adhere a cover plate made from a flexible insulated base plate, on whose under surface an adhesive is coated, to the upper surface of a baseplate, so as to maintain their respective moving contacts inside the through-holes on the flexible insulated baseplate, and the active moving contacts are moveable on the thin adhesive layer except for through-holes of the baseplate, taking advantage of adhering the thin adhesive layer to the base plate where the fixed contacts are corresponding to the moving contacts to realize an anti-dust function of the switch panel. Said invention adopts an anti-dust adhering method, but the panel switch of said invention is not suitable for a long time service, even losing the electric conductivity due to excessive dust stuck thereto.

Chinese Patent Application No. 201110027418.8 discloses a "Conductive Rubber Pill". The conductive rubber pill contains a rubber base and a metal coating film which is on the surface of the rubber base. The metal coating film could be one layer or more layers, and the total thickness of the metal coating film is 0.05 µm-1 mm. The conductive rubber pills are columnar, with circular, oval or polygonous cross-sections whose diameters are 1-10 mm. The preparation method is as follows: firstly, make rubber sheets by press molding, injection molding or by calendar molding; Secondly, apply a metallic coating on the rubber sheet with a plating process; and then punch, shear cut or laser cut the sheet to obtain the pills. The metallic coatings or platings on conductive rubber pills described in this invention have good electric conductivity, but these pills have low overall mechanical strength, and the metallic coatings are usually thin. As switch contacts, they have a relatively short service life.

Chinese Patent Application No. 201110193369.5 provides a "Roughened Metal and Rubber Composite Conductive Pills", which are made by bonding a metal layer and a rubber matrix, or by cutting after bonding. The metal surface is roughened, with pits, bumps, or both. The pits and bumps are on the external or internal surface of the metal layer, or on both surfaces. The pitting depth is less than the thickness of the metal layer, and the height of bumps is not less than $\frac{1}{10}$ of the metal layer thickness. The metal layer material is a metal or an alloy, and the external surface of the metal layer can be plated with gold, silver, copper or nickel etc. the rubber matrix is silicone rubber or polyurethane rubber. Between the metal surface and the rubber matrix there may be a layer of adhesive, which is a kind of thermal cured adhesive or primer, or the same material as the rubber matrix. The metal layer can be coated with a coupling agent and other adhesion promoters. In said invention, the metal layer has high strength, stable electrical conductivity and high bonding strength, and the rubber matrix has high elasticity; when the roughened metal surface is plated with precious metals such as gold or silver, a larger surface area results in more precious metal consumption, as compared to the plating on a flat metal surface. This leads to a high cost, and thus the practical applications would be limited. Moreover, as the relationship between the electrical conductivity and the size and spacing of pits and bumps is unclear and undetermined, the direct use of this technology is impacted by some unknown technical issues.

Chinese Patent Application No. 2011100278634 discloses "A process to Partially Plate Gold on the Commemorative Coins", introducing a decorative gold plating process and its product. This patent does not relate the effect of partial gold plating on the mechanical properties and electrical properties.

SUMMARY OF THE INVENTION

First purpose of the invention is to overcome the deficiency of traditional contact components (or conductive pills), which can not simultaneously maintain mechanical properties, electrical conductivity and material costs, while providing a kind of switch contact components with good electric conductivity and resistance to dust and oil stains at low cost.

The first technical scheme of the invention: the switch contact components (or conductive pills) provided by the instant invention, used as switch contacts (or buttons) and capable of conducting the circuits by touching the two or more contacts in circuit boards (such as PCBs), are small cylindrical, elliptical, or prismatic granules with a thickness of 0.5-8 mm and a cross-section of 0.8-80 mm$^2$ (preferably 5-50 mm$^2$) with a three layer structure:

The under layer is a rubber, preferably silicone rubber; a continuous base metal sheet is sandwiched as the mid layer, while the upper layer is a discontinuous (striped, dotted or latticed) full precious metal plating or a bimetallic composite layer of a discontinuous base metal plating and a precious metal plating. The base metal plating is between the mid-layer and the precious metal plating.

In this invention the meaning of "discontinuous": in stripes); dense and discrete convex dots; or lattices; the said stripes, convex dots or lattices are protruding from the mid-layer.

The stripes are 0.05-2 mm wide, spaced at interval of 0.2-2 mm; and the spacing between the two adjacent stripes must be less than the minimum spacing between two contacts to be electrically connected on the circuit board (the case of minimum spacing between the conductive contacts less than 0.2 mm is not suitable to this invention, and rarely used, so exclusive of this invention).

The convex dots are similar to cylinders or prisms, and the diameters of their top surfaces or circumcircles are 0.2-2 mm, spaced at intervals of 0.05-1 mm, and the spacing between the adjacent convex dots must be less than a half of minimum spacing between any two conductive contacts to be electrically conducted on the circuit board to ensure that two or more convex dots may make conductive contact with another corresponding circuit board at the same time.

The width of latticed lines is 0.05-2 mm, and the void area between the lattice lines is 0.05-5 $mm^2$.

The thickness of the under layer is larger than the mid layer, the thickness of the mid layer is larger than that of the upper layer, and 50 μm<the thickness of the mid layer<1 mm.

The upper layer's thickness meets the following condition: in case of stripes, the minimum width of the stripe× thickness>$2\times10^{-4}$ $mm^2$ so as to allow conducted current to be greater than the safety current of the conductive contact of the circuit board to get through and to ensure the required design service life, and to ensure the contacts can endure enough life cycles will be reduced to arc ablation during switching on/off. In case of dense dots, the convex dots bottom surface circumcircle's diameter×thickness>$1\times10^{-4}$ $mm^2$, so as to allow conducted current to be greater than the safety current of the switch contact component", or the "conductive pill of the circuit board to get through (the safety current is set as 0.5 A). Meanwhile, the respective electrical resistance is relatively small. The conductivity of a lattice-like plating is relatively good, and thus no excessive requirements for the lattice-like plating thickness are specified.

The base metal plating thickness in a bimetallic composite layers is 1.5-10 times the thickness of precious metal plating, so as to obtain a low cost and an low electrical resistivity.

The material of the base metal is: copper, nickel, titanium, aluminum, zinc or iron, etc., the alloy of any of these metals, or a laminated composite containing any one of these metals or their alloys. Stainless steel is preferred. These base metals, compared to precious metals, are cheap, available easily, and chemically stable in the atmosphere, and has definite electric conductivity.

The said precious metal material is: gold, silver, ruthenium, rhodium, palladium, osmium, iridium or platinum, or an alloy of any of them. Gold is preferred. The precious metals are chemically resistant. Under common conditions, they are not easily reacted with the pollutants in the environment, but have good electric and thermal conductivity, and good stability and reliability in electrical conductivity. Specially, gold, in addition to its excellent chemical stability, has good electric conductivity. The conductivity of gold is only second to silver and copper among the pure metals.

The second purpose of the invention: to provide a preparation method for the above switch contacts.

The second technical scheme of the invention: the preparation method includes the following sequenced procedures: The first combination of procedures:
1) A base metal sheet is used as a substrate. On the upper surface of the substrate, one 2-10 μm thick plating mask is printed with an ink that is dissolvable with a solvent, an acidic solution or an alkaline solution so that the areas on the upper surface of the substrate not covered with the plating mask are exposed with dense metallic convex dots, stripes or lattices;
2) On the areas not covered with the plating mask, one precious metal plating is applied by electroplating or electroless plating; or one plating of base metal plating is applied before the plating of precious metal plating is applied thereto;
3) The plating mask is removed by dissolution by the use of solvents, alkaline solutions or acidic solutions;
4) The undersurface of the plated base metal sheet is bonded with silicone rubber by thermal vulcanization to form a 0.25-5 mm thick composite sheet. Before thermal vulcanization, the undersurface of the sheet can be treated with a primer or an adhesive, so as to ensure a good adhesion between the undersurface of the sheet and silicone rubber;
5) The composite sheet is cut or punched into cylindrical, prismatic or elliptical granules in cross sectional area of 0.8-80 $mm^2$.

Alternatively, the contact components are prepared in a sequential procedure as follows:
1) The undersurface of the base metal sheet substrate is bonded with a silicone rubber by thermal vulcanization to form a 0.25-5 mm thick composite sheet.
2) On the other side of the base metal sheet (i.e., the upper surface of the sheet), one 2-10 μm thick plating mask is printed with an ink which is dissolvable in a solvent, an acidic solution or an alkaline solution so that the areas of the substrate surface not covered with the plating mask is exposed with convex dots, stripes or lattices.
3) On the areas of the substrate not covered with the plating mask, one precious metal plating is applied, for example, by electroplating or electroless plating, or one base metal plating is applied before the precious metal plating is applied;
4) The plating mask is removed by dissolution by the use of solvents, alkaline solutions or acidic solutions;
5) The composite sheet is cut or punched into cylindrical, prismatic or elliptical granules with cross sectional areas of 0.8-80 $mm^2$, or into small disks with diameters of 1-10 mm, or elliptic cylindrical granules with shorter axes of 1-8 mm.

Beneficial Effects

The switch contact components disclosed in this invention shall produce greater pressure intensity on the conductive contacts in the circuit board when installed in a keypad or switch and pressed with the same load, than traditional switch components which have flat contact surfaces, and thus, they have better conductivity and better conduction stability; furthermore, they have better dust and oil stain resistance when switched on for conduction, as dust and oil stains will fall into the gaps between stripes or convex dots as set in advance by this invention, while the precious metal layer or the bimetallic composite layer provides good electrical conductivity. Application of this invention provides better reliability in circuit conduction.

Because the plating layer is a discontinuous structure of stripes, dots or lattices, the gold consumption can be cut in half or more, as compared to a traditional full layer of gold plating. The bimetallic composite structure will reduce use of precious metal as much as 90%, and thus largely reduce the raw material cost of the conductive pills.

The switch contact components disclosed in this invention have a multi-laminated composite structure, which makes the switch contact components' mechanical strength enough high, the anti-deformation capability much better, dust and oil stain resistance greatly improved, and meanwhile, the physical appearance stereoscopic and innovative.

DETAIL DESCRIPTION OF EMBODIMENTS

The detail description of this invention is given below in light of the attached figures and examples.

Practical Example No. 1

Figure 1:
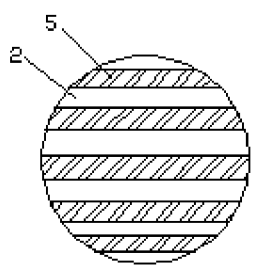
FIG. 1 is a top view of the structure of this invention
Figure 2:
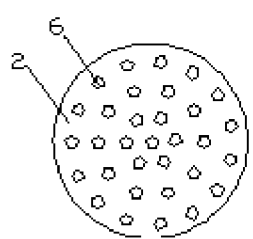
FIG. 2 is a top view of another structure of this invention
Figure 3:
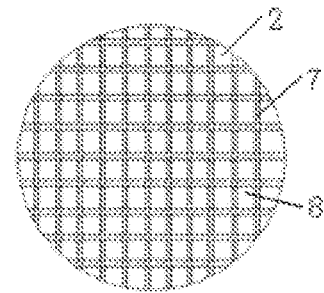
FIG. 3 is a top view of the third structure of this invention
Figure 4:
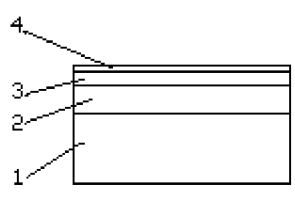
FIG. 4 is a schematic drawing for the longitudinal section structure of FIG. 1
Figure 5:
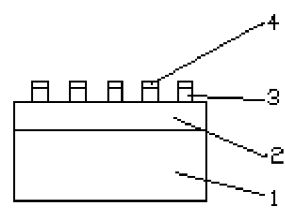
FIG. 5 is a schematic drawing for the transverse section structure of FIG. 1
Elements in the figures are: 1. silicone rubber; 2. base metal sheet layer; 3. base metal plating; 4. precious metal plating; 5. stripe; 6. convex dots; 7. lines; 8. voids

The switch contact component as shown in FIGS. 1, 4, and 5, is a small elliptic columnar granule with a three layer laminated structure, with a thickness of 3 mm and a cross sectional area of 8 mm$^2$.

The under layer is a silicone rubber layer 1; the continuous base metal copper sheet layer 2 is sandwiched as a mid layer; and the upper layer is a bimetallic layer of striped base metal nickel plating 3 and precious metal gold plating 4. The stripe 5 is 1 mm wide and the spacing between the adjacent stripes 5 is 1.5 mm, and the thickness of the base metal plating 3 of the composite layer is 3 times the thickness of the precious metal plating 4.

The said nickel base metal plating 3 is between the base metal sheet 2 and the precious metal gold plating 4.

The upper layer thickness meets the following condition: the stripe's minimum width×thickness>$1\times10^{-3}$ mm$^2$
The under layer thickness is greater than the mid-layer; the mid-layer thickness is greater than that of the upper layer, and 0.5 mm<mid-layer thickness<1 mm

Practical Example No. 2

A square stainless steel sheet (the material is, for example, SS304) with a side length of 100 mm and a thickness of 0.05 mm, is cleaned with an alkaline detergent, treated with 5% dilute hydrochloric acid for 3 minutes to remove the oxides on the stainless steel surface, and then rinsed with de-ionized water. After drying, one side of the sheet (the undersurface) is coated with a rubber-metal adhesive (such as Megum 3270), and then the coated undersurface is bonded with silicone rubber (such as KE 951) by thermal vulcanization to form a 1.0 mm thick stainless steel-silicone rubber laminated composite sheet. On the stainless steel surface of this composite sheet, a partial coating of 6 micron thick ink, which is dissolvable in an organic solvent but not dissolvable in an acidic or alkaline solution, is printed, leaving latticed voids (7; 8) with the lattice line (7) 1 mm wide, and the void area (8) between the latticed lines 1 mm$^2$. The ink, as the plating mask, makes the areas of the composite sheet not covered with the plating mask become latticed (7; 8) grid to expose the stainless steel surface; on the areas of stainless steel sheet not covered with the plating mask, one plating of 5 micron thick nickel is plated by electroplating before a plating of gold with a thickness of 1 micron and a purity of greater than 99% is applied; then an organic solvent is used to wash out the plating mask; this nickel-plated and gold-plated composite sheet is punched into small cylindrical granules with a diameter of 5 mm. These small cylindrical granules, as contact components for pairing with the contacts in PCBs, are used to make the silicone rubber keypads. These switches so structured have good mechanical strength, long service life, and good dust and oil stain resistance.

We claim:
1. A switch contact component,
wherein the switch contact component is
used as a switch conducting contact,
capable of connecting two or more conducting contacts switching on a circuit board, being a small cylindrical, elliptical or prismatic disk with a thickness of 0.5-8 mm and a cross sectional area of 0.8-80 mm$^2$, and being structured in three layer lamination, comprising:
an under layer, which is a rubber (1);
a continuous base metal sheet, sandwiched as a mid layer (2); and
an upper layer, having a pattern selected from striped, convex dotted, and latticed, being either a layer comprising a precious metal plating or a bimetallic composite layer formed by base metal plating (3) and a precious metal plating in which
said base metal plating (3) is sandwiched between the mid layer (2) and the precious metal plating (4);
wherein a base metal plating material is selected from copper, nickel, titanium, aluminum, zinc or iron, or any alloy of them, or a laminated composite containing any of them or their alloys;
wherein a precious metal plating material is selected from gold, silver, ruthenium, rhodium, palladium, osmium, iridium or platinum, or any of their alloys;
wherein a width of each stripe in the striped pattern (5) is 0.05-2 mm, the stripes are spaced at intervals of 0.2-2 mm; each interval is smaller than a minimum spacing of two adjacent ones of the two or more conducting contacts on the circuit board;
wherein said convex dots of the convex dotted pattern are substantially cylindrical or prism-shaped, and the diameters of their respective top surfaces or circumferences are 0.2-2 mm, and spacing between the adjacent convex dots (6) is 0.05-1 mm, and the spacing between adjacent dots is smaller than a half of a minimum spacing of two adjacent ones of the two or more conducting contacts on the circuit board, to ensure more than two convex dots (6) contact a conducting contact on an other circuit board simultaneously;
wherein latticed lines of the latticed pattern (7) are 0.05-2 mm wide, and a void (8) area between adjacent latticed lines is 0.05-5 mm$^2$;

wherein an upper layer thickness satisfies the following condition: in case of stripes, the stripes minimum width×thickness>$2\times10^{-4}$ mm$^2$; when dots are utilized, the convex dots (6) bottom circumference diameter× thickness>$1\times10^{-4}$ mm$^2$.

2. According to claim 1, wherein a thickness of the under layer is greater than that of the mid layer; the mid layer thickness is greater than that of the upper layer, and 50 μm<the mid layer thickness<1 mm.

3. According to claim 1, wherein the base metal plating (3) is 1.5-10 times as thick as the precious metal plating (4) in the bimetallic composite layer.

4. According to claim 1, wherein said rubber is silicone rubber, said base metal material is stainless steel, and said precious metal material is gold with a purity of higher than 99%.

5. A preparation method for a switch contact component comprising:
preparing the switch contact component of claim 1, having the steps of:
1) using a base metal sheet (2) as a substrate, and printing one 2-10 μm thick plating mask on an upper surface of the substrate with an ink which is dissolvable with a solvent, an acidic solution or an alkaline solution so that areas not covered with the plating mask are exposed with dense metallic convex dots (6), stripes, or lattices (5) of the substrate upper surface;
2) plating on the areas of the upper surface of the substrate that is not covered with the plating mask, one plating of precious metals (4), or one plating of base metals (3) before the plating of precious metal (4) is applied thereto;
3) removing the plating mask by dissolution using another solvent, another alkaline solution or another acidic solution;
4) bonding an undersurface of the plated sheet with a silicone rubber by thermal vulcanization to form a composite sheet in a thickness of 0.25-5 mm;
5) cutting or punching the composite sheet into cylindrical, elliptical or prismatic disks with cross sectional areas of 0.8-80 mm$^2$.

6. A preparation method for a switch contact component comprising:
preparing the switch contact component of claim 1, having the steps of:
1) using a base metal sheet (2) as a substrate, and on an undersurface of the substrate bonding, a silicone rubber by thermal vulcanization to form a composite sheet with a thickness of 0.25-5 mm;
2) printing one 2-10 μm thick plating mask on a bottom side of the base metal sheet, with an ink which is dissolvable in a solvent, an acidic solution or an alkaline solution so that areas of the substrate not covered by the plating mask is exposed with metallic convex dots (6), stripes or lattices (5);
3) plating, on areas of the substrate not covered by the plating mask, one plating of precious metal (4), or applying one plating of base metals (3) before the plating of precious metal (4) is applied on the base metal plating (3);
4) removing the plating mask by dissolution;
5) cutting or punching the plated composite sheet into cylindrical, elliptical or prismatic disks with cross sectional areas of 0.8-80 mm$^2$.

* * * * *